United States Patent
Jung et al.

(10) Patent No.: US 9,933,650 B2
(45) Date of Patent: Apr. 3, 2018

(54) FRINGE FIELD LIQUID CRYSTAL DISPLAY DEVICE

(71) Applicant: LG Display Co., Ltd., Seoul (KR)

(72) Inventors: Tae Yong Jung, Gumi-si (KR); Hyun Seok Hong, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 207 days.

(21) Appl. No.: 14/324,533

(22) Filed: Jul. 7, 2014

(65) Prior Publication Data

US 2015/0331290 A1 Nov. 19, 2015

(30) Foreign Application Priority Data

May 13, 2014 (KR) .................. 10-2014-0056920

(51) Int. Cl.
*G02F 1/1335* (2006.01)
*G02F 1/1362* (2006.01)
*G02F 1/1343* (2006.01)

(52) U.S. Cl.
CPC .. *G02F 1/133514* (2013.01); *G02F 1/134309* (2013.01); *G02F 1/134336* (2013.01);
(Continued)

(58) Field of Classification Search
CPC ......... G02F 2001/136218; G02F 2001/13629; G02F 2001/136295; G02F 2001/1552;
(Continued)

(56) References Cited

U.S. PATENT DOCUMENTS

2004/0095521 A1* 5/2004 Song ................. G02F 1/133514
349/61
2005/0116615 A1* 6/2005 Matsumoto ......... H01L 27/3213
313/500
(Continued)

FOREIGN PATENT DOCUMENTS

CN 1588197 3/2005
CN 1869772 11/2006
(Continued)

OTHER PUBLICATIONS

English translation of KR 20110024596 A, Title: In Plane Switching Mode Liquid Crystal Display Device, Author: Lyu Ki Hyun, Kim Jeong Ki, Kwon Jae Chang; Date of publication: Mar. 9, 2011.*
(Continued)

*Primary Examiner* — Edward Glick
*Assistant Examiner* — Shan Liu
(74) *Attorney, Agent, or Firm* — Fenwick & West LLP (57) ABSTRACT

A liquid crystal display (LCD) device comprises a first pixel area; a second pixel area that is smaller than the first pixel area; a first pixel electrode formed in the first pixel area and having a first size; a first common electrode formed in the first pixel area, the first common electrode overlapping the first pixel electrode by a first overlap area; a second pixel electrode formed in the second pixel area and having a second size that is smaller than the first size of the first pixel electrode; a second common electrode formed in the second pixel area, the second common electrode overlapping the second pixel electrode by a second overlap area; wherein the first overlap area and the second overlap area are substantially the same.

19 Claims, 8 Drawing Sheets

(52) U.S. Cl.
CPC .. *G02F 1/136286* (2013.01); *G02F 1/136213* (2013.01); *G02F 2001/134318* (2013.01); *G02F 2001/134372* (2013.01)

(58) Field of Classification Search
CPC ..... G02F 2001/1555; G02F 2001/1557; G02F 2201/12; G02F 2201/121; G02F 2201/122; G02F 2201/123; G02F 2201/124; G02F 2201/14; G02F 2202/10; G02F 1/0316; G02F 1/1343; G02F 1/134309; G02F 1/13439; G02F 1/136286; G02F 1/155; G02F 1/1393; G02F 1/1395; G02F 2001/1357; G02F 2001/13685; G02F 1/1362; G02F 1/136209; G02F 1/136227; G02F 1/1365; G02F 1/1368; G02F 2001/136222; G02F 2001/136231; G02F 2001/13625; G02F 2001/1635; H01L 23/49534; H01L 27/124; H01L 27/3276; H01L 27/3279; H01L 27/329; H01L 27/3297; H01L 2933/0016; H01L 29/78666; H01L 29/78675; G09G 2300/0421; G09G 2300/0426; G09G 2300/0439; G09G 3/3659
USPC ................. 349/139, 46–47, 42–43, 104–109
See application file for complete search history.

(56) References Cited

U.S. PATENT DOCUMENTS

| | | |
|---|---|---|
| 2006/0262262 A1 | 11/2006 | Kim et al. |
| 2007/0019145 A1 | 1/2007 | Rho et al. |
| 2007/0115417 A1 | 5/2007 | Ge et al. |
| 2008/0143897 A1 | 6/2008 | Chang |
| 2009/0091816 A1* | 4/2009 | Kim ................... G02F 1/133377 359/296 |
| 2009/0109358 A1 | 4/2009 | Tanaka et al. |
| 2011/0156165 A1 | 6/2011 | Jang et al. |
| 2011/0181824 A1* | 7/2011 | Nagano ............. G02F 1/134363 349/143 |
| 2011/0221715 A1* | 9/2011 | Yang ................... G02F 1/13454 345/204 |
| 2012/0320297 A1* | 12/2012 | Itsumi ................. G09G 3/3648 349/43 |
| 2013/0135845 A1* | 5/2013 | Matsui .................... G09F 13/04 362/97.1 |
| 2014/0204321 A1* | 7/2014 | Koh .................. G02F 1/133514 349/109 |
| 2014/0362322 A1* | 12/2014 | Park .................. G02F 1/136286 349/46 |

FOREIGN PATENT DOCUMENTS

| | | |
|---|---|---|
| CN | 1900800 | 1/2007 |
| CN | 101424834 | 5/2009 |
| CN | 103137023 | 6/2013 |
| KR | 20110024596 A * | 3/2011 |
| TW | 200807073 A | 2/2008 |
| TW | 201122695 A | 7/2011 |

OTHER PUBLICATIONS

Office Action for Chinese Patent Application No. CN 201410397192.4, dated Aug. 17, 2017, 20 Pages. (With English Translation).

* cited by examiner

FRINGE FIELD LIQUID CRYSTAL DISPLAY DEVICE

CROSS-REFERENCE TO RELATED APPLICATIONS

This application claims the benefit of the Korean Patent Application No. 10-2014-0056920 filed on May 13, 2014, which is hereby incorporated by reference as if fully set forth herein.

BACKGROUND

Field of Technology

The embodiments herein relate to a fringe field liquid crystal display (LCD) device, and more particularly, to a fringe field LCD device which can enhance color purity, and prevent the occurrence of flicker.

Discussion of the Related Art

LCD devices, which are widely used as a type of display device, are largely categorized into lateral electric field LCD devices, vertical electric field LCD devices, and fringe field LCD devices depending on a direction of an electric field which is applied for controlling alignment of liquid crystal. In fringe field LCD devices, one of a common electrode and a pixel electrode is flatly formed in a pixel area, and the other electrode is formed as a slit type with a protective layer therebetween. The fringe field LCD devices enhance an aperture ratio in comparison with the lateral electric field LCD devices, and realize a wide viewing angle in comparison with the vertical electric field LCD devices. Accordingly, the fringe field LCD devices are being applied to various electronic devices.

As the demand for high-definition display devices such as ultra high definition (UHD) display devices increases, it is required to solve problems of resolution, light transmittance, and power consumption in high-definition LCD devices. To solve the problems, various pixel structures applied to LCD devices are being developed.

Figure 1A:
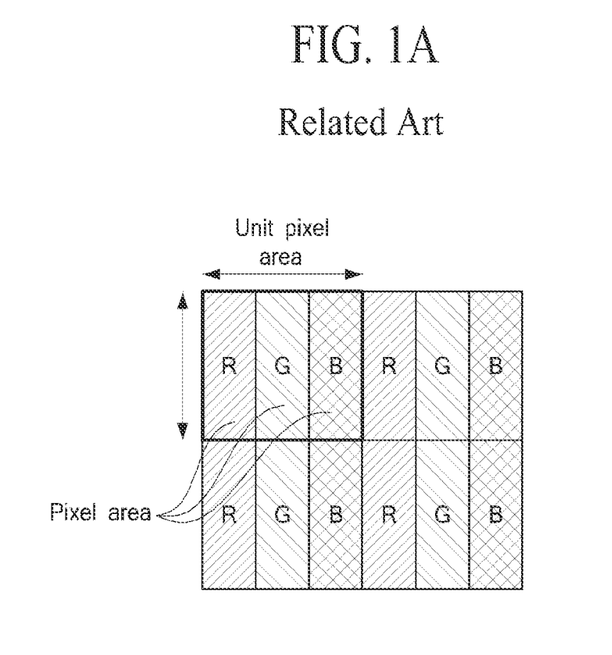
FIG. 1A is a schematic view of a related art RGB pixel structure.
Figure 1B:
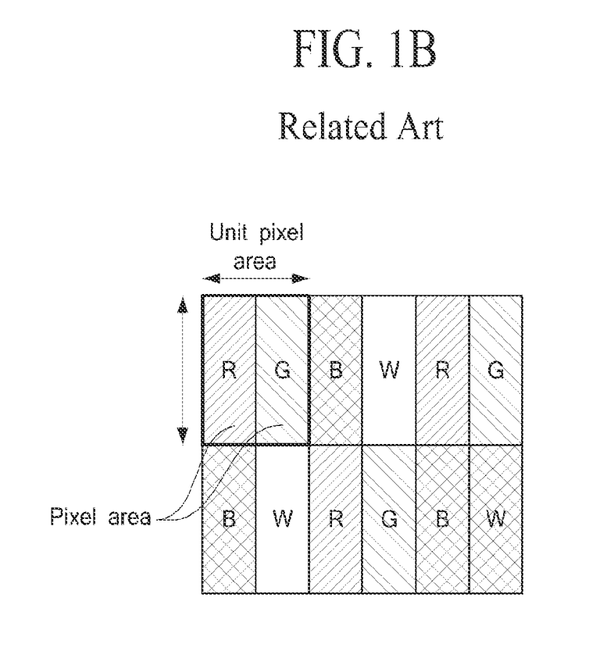
FIG. 1B is a schematic view of a related art RGBW pixel structure.

FIG. 1A is a view illustrating a pixel structure in a related art LCD device having a red, green, blue (RGB) stripe structure, and FIG. 1B is a view illustrating a pixel structure in a related art LCD device having an red, green, blue, and white (RGBW) quad structure.

In a related art RGB stripe structure, as illustrated in FIG. 1A, one unit pixel area is defined by three adjacent pixel areas that respectively emit red (R) light, green (G) light, and blue (B) light. Unlike organic light emitting display devices, LCD devices need a separate light source, and light emitted from the light source passes through liquid crystal, and passes through a color filter included in each pixel to realize a color.

Therefore, in the RGB stripe structure, a plurality of pixel areas and color filters which display the same color are formed as a stripe type on an arbitrary column or row. On the other hand, in the RGBW quad structure, one unit pixel area is defined by two adjacent pixel areas.

For example, as illustrated in FIG. 1B, one unit pixel area including a R pixel area and a G pixel area is provided, and each of four unit pixel areas which are upward, downward, left, and right adjacent to the one unit pixel area includes a B pixel area and a W pixel area in which a separate color filter is not formed. Light emitted from the light source is irradiated onto a screen through the W pixel area without passing through the W pixel area, and thus, a brighter screen than the related art RGB stripe structure is realized, and light transmittance is improved.

However, in the related art RGBW quad structure, as illustrated in FIG. 1B, all pixel areas are designed to have the same size. Here, the whole light transmittance increases compared to the related art RGB stripe structure, but R, G, and B pure color luminance and color coordinates are changed. That is, whole luminance is increased by the W pixel area, but since an area of the W pixel area is added, areas of RGB pixel areas are reduced, causing a reduction in luminance of colors such as R, G, and B. For this reason, in the related art RGBW quad structure, an imbalance of luminance is caused by a color, causing a change in color coordinates.

SUMMARY

Accordingly, the embodiments are directed to provide a fringe field LCD device that substantially obviates one or more problems due to limitations and disadvantages of the related art.

The embodiments here are directed to provide a display device in which R, G, B, and W pixel areas are designed in an asymmetrical structure, and color coordinates are prevented from being changed by an imbalance of luminance caused by a color.

In one embodiment, a pixel structure is provided for preventing flicker from occurring when pixel areas are designed in the asymmetrical structure.

In one embodiment, a fringe field liquid crystal display (LCD) comprises a first pixel area and a second pixel area, the first pixel area configured to have a different size from the second pixel area; a first pixel electrode formed in the first pixel area; a second pixel electrode formed in the second pixel area, the second pixel electrode configured to have a size which differs from a size of the first pixel electrode; a first common electrode configured to overlap the first pixel electrode with a protective layer formed between the first common electrode and the first pixel electrode, the first common electrode including at least one first slit part; and a second common electrode configured to overlap the second pixel electrode with the protective layer formed between the second common electrode and the second pixel electrode, the second common electrode including at least one second slit part which has a size that is different from a size of the at least one first slit part.

A liquid crystal display (LCD) device comprises a first pixel area; a second pixel area that is smaller than the first pixel area; a first pixel electrode formed in the first pixel area and having a first size; a first common electrode formed in the first pixel area, the first common electrode overlapping the first pixel electrode by a first overlap area; a second pixel electrode formed in the second pixel area and having a second size that is smaller than the first size of the first pixel electrode; a second common electrode formed in the second pixel area, the second common electrode overlapping the second pixel electrode by a second overlap area; wherein the first overlap area and the second overlap area are substantially the same.

A liquid crystal display (LCD) device comprises a first pixel area; a second pixel area that is smaller than the first pixel area; a first electrode of a first type formed in the first pixel area and having a first size; a first electrode of a second type formed in the first pixel area, the first electrode of the second type overlapping the first electrode of the first type by a first overlap area; a second electrode of the first type formed in the second pixel area and having a second size that is smaller than the first size of the first electrode of the first type; a second electrode of the second type formed in the second pixel area, the second electrode of the second type overlapping the second electrode of the first type by a second overlap area; wherein the first overlap area and the second overlap area are substantially the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a fringe field liquid crystal display (LCD) device including: first and second pixel areas configured to have different size; a first pixel electrode formed in the first pixel area; a second pixel electrode formed in the second pixel area, and configured to have a size which differs from an area of the first pixel electrode; a first common electrode configured to overlap the first pixel electrode with a protective layer therebetween, the first common electrode including at least one first slit part; and a second common electrode configured to overlap the second pixel electrode with the protective layer therebetween, the second common electrode including at least one second slit part which has a size differing from an area of the at least one first slit part.

The first common electrode may be formed in the first pixel area which displays red or green, and the second common electrode may be formed in the second pixel area which displays blue or white.

A size of the first pixel area may be broader than a size of the second pixel area.

The first common electrode may include a plurality of first common electrode parts and a plurality of second common electrode parts extending from the plurality of first common electrode parts, in the first pixel area, and the first slit part may be provided by the plurality of first common electrode parts and the plurality of second common electrode parts.

The second common electrode may include a plurality of third common electrode parts and a plurality of fourth common electrode parts extending from the plurality of third common electrode parts, in the second pixel area, and the second slit part may be provided by the plurality of third common electrode parts and the plurality of fourth common electrode parts.

The plurality of first common electrode parts and the plurality of third common electrode parts may be formed in a direction where a data line extends, and the plurality of second common electrode parts and the plurality of fourth common electrode parts may be formed in a direction where a gate line extends.

A width of each of the plurality of first common electrode parts may differ from a width of each of the plurality of third common electrode parts.

The width of each of the plurality of first common electrode parts may be narrower than the width of each of the plurality of third common electrode parts.

A width of each of the plurality of second common electrode parts may differ from a width of each of the plurality of fourth common electrode parts.

The width of each of the plurality of second common electrode parts may be narrower than the width of each of the plurality of fourth common electrode parts.

A storage capacitor having a first capacitance may be formed between the first pixel electrode and the first common electrode, a storage capacitor having a second capacitance may be formed between the second pixel electrode and the second common electrode, and the first capacitance may be the same as the second capacitance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2A:
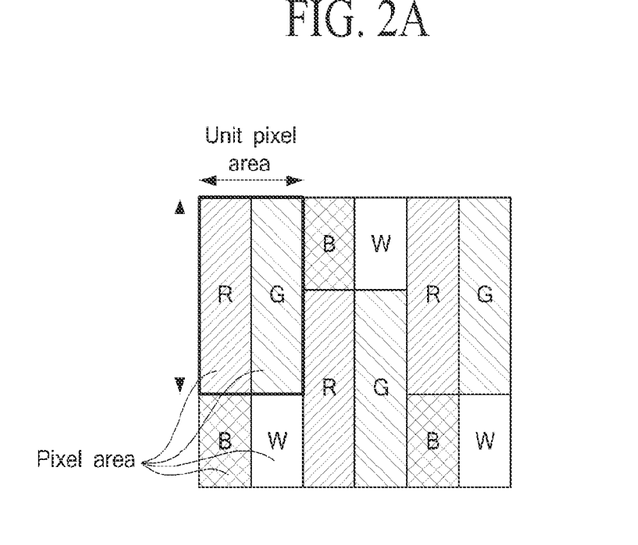
FIG. 2A is a schematic view of an asymmetrical RGBW pixel structure according to a first embodiment.
Figure 2B:
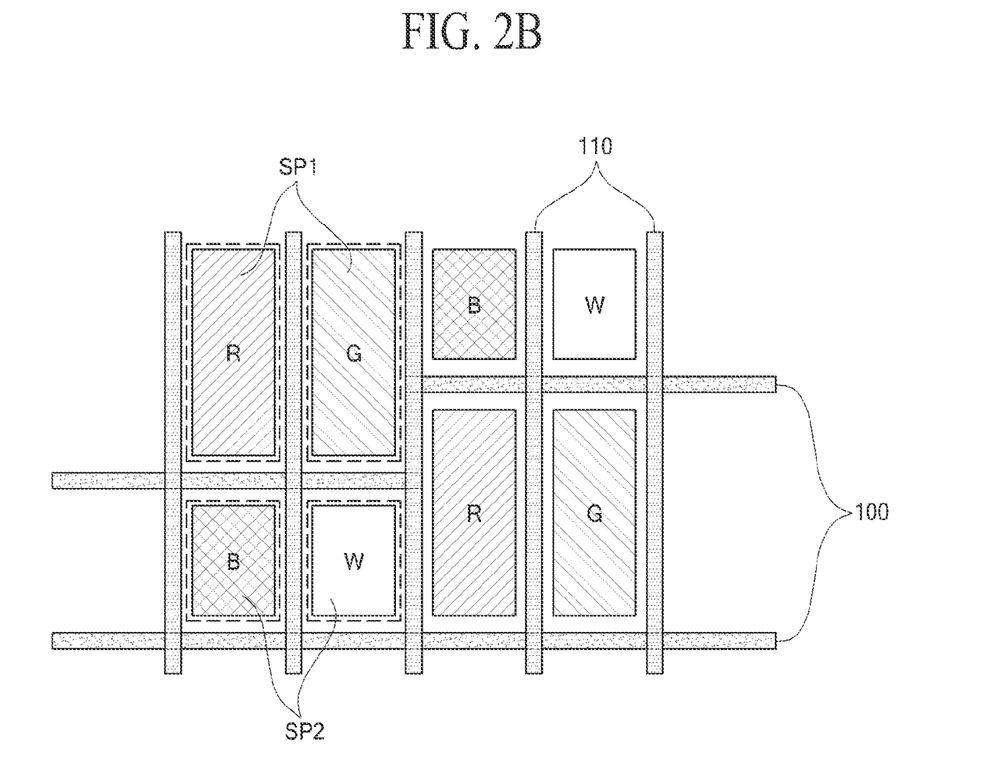
FIG. 2B is a schematic view of an asymmetrical RGBW pixel structure according to a second embodiment.

FIG. 2A is a schematic view of a pixel structure of a fringe field LCD device according to a first embodiment. FIG. 2B is a schematic view of a pixel structure of a fringe field LCD device according to a second embodiment.

As illustrated in FIG. 2B, a plurality of gate lines 100 and a plurality of data lines 110 intersect each other to form a matrix type. A thin film transistor (TFT, not shown) is formed in each of a plurality of pixels defined by intersections between the plurality of gate lines 100 and the plurality of data lines 110, and controls driving of each pixel according to a gate signal and a data signal.

A first pixel area SP1 or a second pixel area SP2 is formed in each of a plurality of areas which are defined by the plurality of gate lines 100 and the plurality of data lines 110.

In the first and second embodiments, as described above, the first pixel area SP1 or the second pixel area SP2 is defined based on a size of each pixel area. The first and second pixel areas SP1 and SP2 are determined based on a color displayed by each pixel area, for controlling an imbalance of luminance caused by a color of each pixel area.

For example, the first pixel area SP1 may be a pixel area that displays red (R) or green (G), and the second pixel area SP2 may be a pixel area that displays blue (B) or white (W).

Furthermore, in the first and second embodiments, a size of the first pixel area SP1 is larger than a size of the second pixel area SP2. That is, the size of the first pixel area SP1 and the size of the second pixel area SP2 are designed to have an asymmetrical structure. Positions of the first and second pixel areas SP1 and SP2 may be changed depending on a design environment, but the second pixel area SP2 may be disposed adjacent to the first pixel area SP1 with respect to a corresponding gate line 100.

Moreover, since a pixel structure is designed as an asymmetrical structure, the plurality of gate lines 100 and the plurality of data lines 110 may be changed in design. As illustrated in FIG. 2B, the gate line 100 may be designed to overlap the data line 110, which is adjacent to the first and second pixel areas SP1 and SP2, at an intersection portion therebetween.

As illustrated in FIG. 2B, the first pixel area SP1 is disposed over the gate line 100, and the second pixel area SP2 is disposed under the gate line 100. Therefore, the gate line 100 is horizontally formed in an area where the first and second pixel areas SP1 and SP2 face each other.

Moreover, the first pixel area SP1 can be disposed under the gate line 100, and the second pixel area SP2 can be disposed over the gate line 100. Therefore, the gate line 100 is horizontally formed in an area where the first and second pixel areas SP1 and SP2 face each other.

Since the first and second pixel areas SP1 and SP2 are asymmetrically formed, some of the gate lines 100 are formed in a straight line, but the other gate lines 100 are not formed in a straight line.

The first and second pixel areas SP1 and SP2 are horizontally disposed adjacent to each other, and the gate line 100 is formed to overlap the data line 100 in a length direction of the data line 110 which is formed between the horizontally adjacent first and second pixel areas SP1 and SP2.

As described above, sizes of the first and second pixel areas SP1 and SP2 are differently and asymmetrically designed, thereby controlling an imbalance of luminance caused by a color which is realized by each pixel area in a related art RGBW quad structure.

Hereinafter, the first embodiment is described in more detail.

Figure 3A:
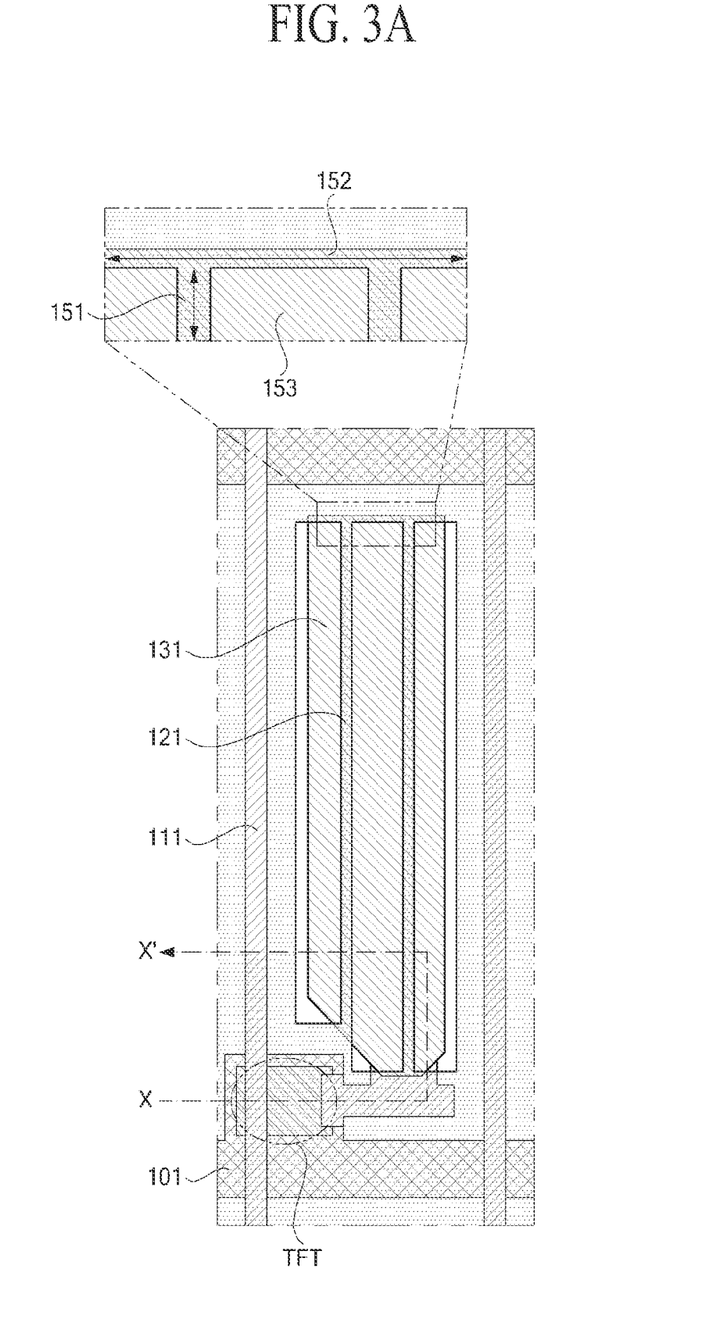
FIG. 3A is a front view of a first pixel area according to the first embodiment.
Figure 3B:
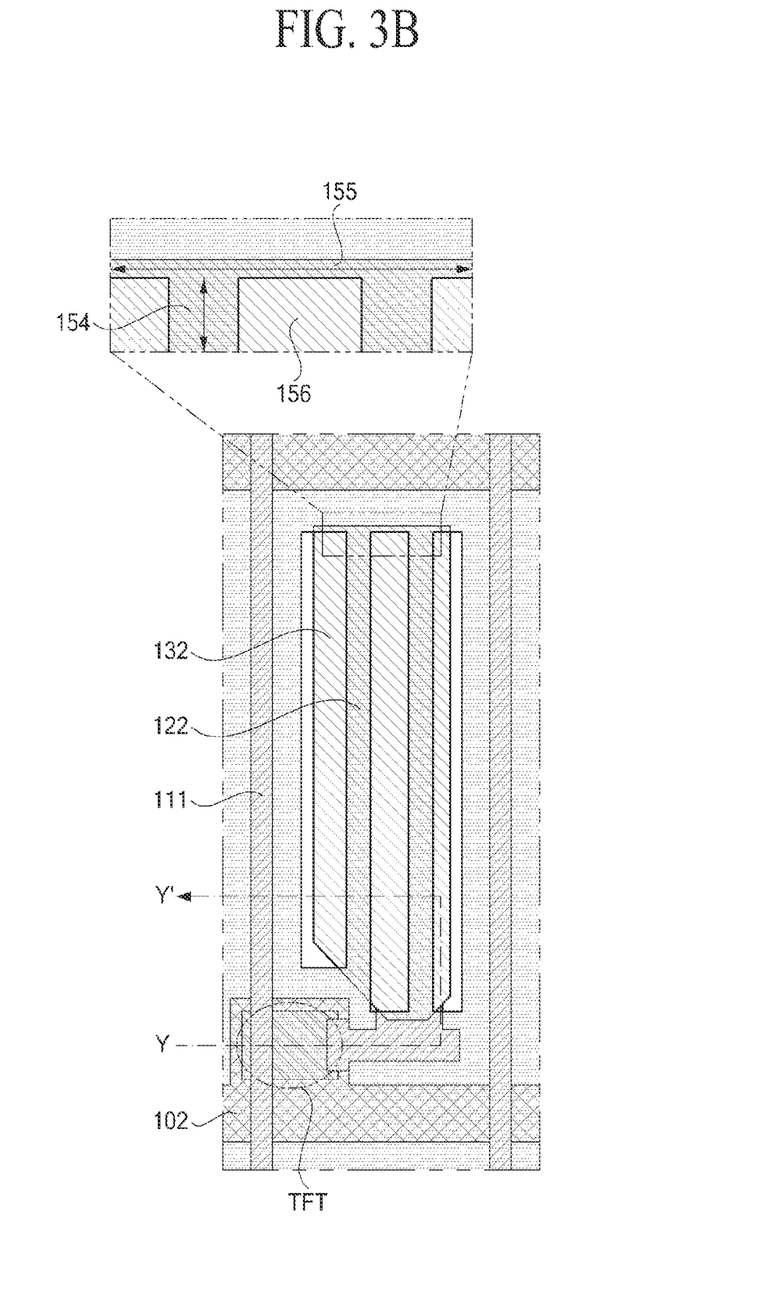
FIG. 3B is a front view of a second pixel area according to the first embodiment.

FIG. 3A is a front view of the first pixel area SP1 of the fringe field LCD device according to the first embodiment, and FIG. 3B is a front view of the second pixel area SP2 of the fringe field LCD device according to the first embodiment.

As illustrated in FIGS. 3A and 3B, in the fringe field LCD device according to the first embodiment, the first pixel area SP1 includes a first pixel electrode 131 and a first common electrode 121, and the second pixel area SP2 includes a second pixel electrode 132 and a second common electrode 122.

In the first embodiment, the first common electrode 121 is formed on the first pixel electrode 131, and the second common electrode 122 is formed on the second pixel electrode 132. However, a stacking order of the first and second pixel electrodes 131 and 132 and the first and second common electrodes 121 and 122 may be changed depending on a design environment.

Moreover, a protective layer 140 (shown in FIG. 4A and FIG. 4B) is formed between the first pixel electrode 131 and the first common electrode 121. Similarly, the protective layer 140 is formed between the second pixel electrode 132 and the second common electrode 122. A storage capacitor Cst is formed between the first pixel electrode 131 and the first common electrode 121. The storage capacitor Cst is also formed between the second pixel electrode 132 and the second common electrode 122. When the TFT is in a turn-on period, the storage capacitor is charged with a voltage. When the TFT is in a turn-off period, a pixel voltage is held by the voltage charged into the storage capacitor.

To provide a more detailed description, a storage capacitor corresponding to a level of a first capacitance "C1" is formed at an area in which the first pixel electrode 131 overlaps the first common electrode 121 with the protective layer therebetween. Also, a storage capacitor corresponding to a level of a second capacitance "C2" is formed at an area in which the second pixel electrode 132 overlaps the second common electrode 122 with the protective layer therebetween. Here, a value of the storage capacitor may be determined based on a size of an area in which the pixel electrode and common electrode in each pixel area overlaps each other.

Figure 4A:
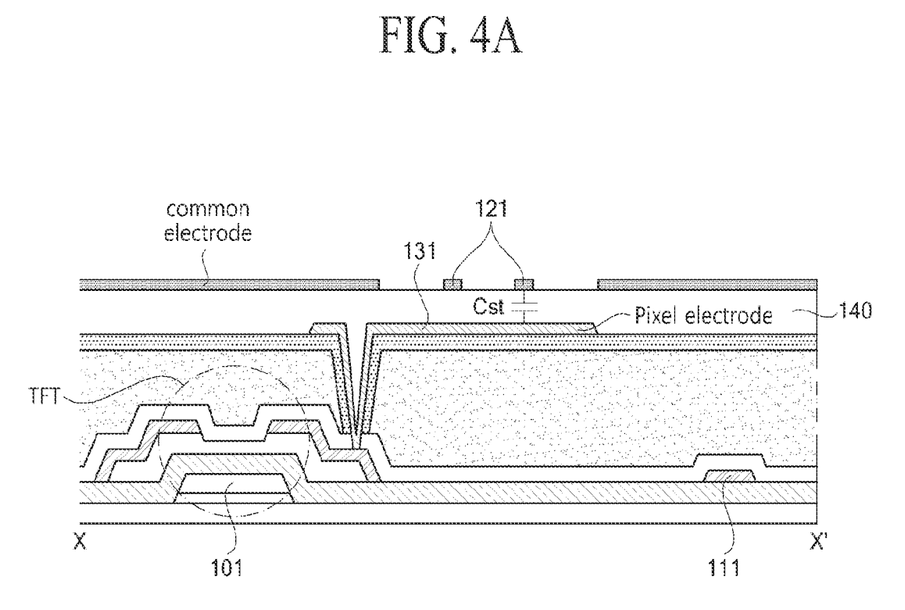
FIG. 4A is a cross-sectional view taken along line X-X' of FIG. 3A according to one embodiment.
Figure 4B:
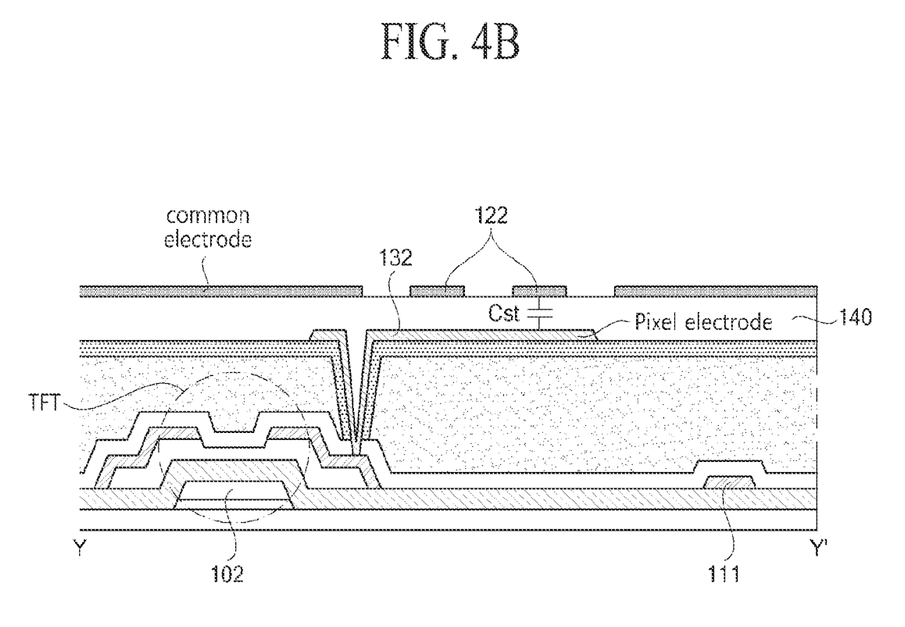
FIG. 4B is a cross-sectional view taken along line Y-Y' of FIG. 3B according to one embodiment.

The protective layer 140 insulates the first and second pixel electrodes 131 and 132 from the first and second common electrodes 121 and 122. The protective layer 140 may be formed of a silicon (Si)-based inorganic insulating material or an organic insulating material such as a polyimide (PI)-based material or photo acryl (PAC)-based material.

Moreover, in the first and second embodiments, it has been described above that the first and second common electrodes 121 and 122 are respectively formed in the first and second pixel areas SP1 and SP2. However, the present embodiment is not limited thereto, and the first and second common electrodes 121 and 122 may be formed as one electrode over the plurality of pixel areas.

Furthermore, in the pixel structures according to the first and second embodiments, when the first and second pixel areas SP1 and SP2 are designed to have different areas, the change of the pixel voltage supplied to each pixel differs causing flicker. The reason that flicker occurs will be described in detail with reference to the following Equation (1):

$$\Delta Vp = \frac{Cgd \Delta Vg}{(Cgd + Clc + Cst)} \quad (1)$$

where $\Delta Vg$ denotes a change of a gate voltage, $Clc$ denotes a liquid crystal capacitor, $Cst$ denotes a storage capacitor, and $Cgd$ denotes a parasitic capacitance value between a gate electrode and drain electrode of the TFT.

Moreover, $\Delta Vp$ denotes a change of a pixel voltage. $\Delta Vp$ is caused by a parasitic capacitor which is formed by an overlap of an area (in which the gate electrode of the TFT is formed) and an area in which the drain electrode of the TFT is formed.

When the TFT in each pixel area is in a turn-on state, a voltage applied to the liquid crystal capacitor Clc and the storage capacitor Cst is distorted by the change "$\Delta Vp$" of a pixel voltage without being held by the parasitic capacitor Cgd, thereby causing flicker.

In Equation (1), when it is assumed that the change "ΔVg" of the gate voltage, the parasitic capacitor Cgd, and the liquid crystal capacitor Clc have a fixed value, the change amount "ΔVp" of the pixel voltage is determined based on a size of the storage capacitor Cst.

The storage capacitor Cst may be determined based on a size of an area in which the first and second pixel electrodes 131 and 132 overlap the first and second common electrodes 121 and 122. Alternatively, the storage capacitor Cst may be determined based on a thickness of the protective layer which is formed between the first and second pixel electrodes 131 and 132 and the first and second common electrodes 121 and 122.

As illustrated in FIGS. 3A and 3B, when an asymmetrical RGBW structure is implemented, an area of the first pixel electrode 131 formed in the first pixel area SP1 differs from that of the second pixel electrode 132 formed in the second pixel area SP2. In one embodiment, the second pixel electrode 132 is smaller than the first pixel electrode 131. Therefore, a size of the storage capacitor Cst formed in the first pixel area SP1 differs from that of the storage capacitor Cst formed in the second pixel area SP2.

Therefore, the change "ΔVp" of the pixel voltage in the first pixel area SP1 differs from the change "ΔVp" of the pixel voltage in the second pixel area SP2. As a result, even when the same level of common voltage is applied to the first and second common electrodes 121 and 122, a voltage charged into the storage capacitor Cst formed in the first pixel area SP1 and a voltage charged into the storage capacitor Cst formed in the second pixel area SP2 are different in a frame of an image causing flicker.

Therefore, in the first embodiment, in the asymmetrical RGBW structure, a first capacitance "C1" of the storage capacitor in the first pixel area SP1 is the same as a second capacitance "C2" of the storage capacitor in the second pixel area SP2 having an area which differs from that of the first pixel area SP1. A first area in which the first pixel electrode 131 overlaps the first common electrode 121 is the same as a second area in which the second pixel electrode 132 overlaps the second common electrode 122.

To implement the asymmetrical RGBW structure, in the first embodiment, the first common electrode 121 includes a slit part 153 in which a portion of the first common electrode 121 is opened in the first pixel area SP1, and the second common electrode 122 includes a slit part 156 in which a portion of the second common electrode 122 is opened in the second pixel area SP2.

In other words, the first common electrode 121 includes a first common electrode part 151, which is formed in a direction where the data line 111 extends in the first pixel area SP1, and a second common electrode part 152 which is formed in a direction where the gate line 101 extends from the first common electrode part 151. Also, the first common electrode 121 may include a first slit part 153 which is provided by the first and second common electrode parts 151 and 152.

Moreover, the second common electrode 122 includes a third common electrode part 154, which is formed in a direction where the data line 111 extends in the second pixel area SP2, and a fourth common electrode part 155 which is formed in a direction where the gate line 102 extends from the third common electrode part 154. Also, the second common electrode 122 may include a second slit part 156 which is provided by the third and fourth common electrode parts 154 and 155.

To provide an additional description, the first common electrode 121 denotes a common electrode which is formed in the first pixel area SP1, and the second common electrode 122 denotes a common electrode which is formed in the second pixel area SP2. On the other hand, the first common electrode part 151 denotes a common electrode area which extends in a direction parallel to the data line 111 in an area where the first common electrode 121 overlaps the first pixel electrode 131, and the second common electrode part 152 denotes a common electrode area which extends in a direction parallel to the gate line 102 in the area where the second common electrode 121 overlaps the first pixel electrode 131. The third common electrode part 154 denotes a common electrode area which extends in a direction parallel to the data line 111 in an area where the second common electrode 122 overlaps the second pixel electrode 132, and the fourth common electrode part 155 denotes a common electrode area which extends in a direction parallel to the gate line 102 in the area where the second common electrode 122 overlaps the second pixel electrode 132.

Furthermore, each of the first to fourth common electrode parts 151 to 154 may be provided in plurality. Therefore, each of the first and second slit parts 153 and 156 may be provided in plurality.

In the first embodiment, as illustrated in FIGS. 3A, 3B, 4A and 4B, a width of the first common electrode part 151 of the first common electrode 121 formed in the first pixel area SP1 is narrower than that of the third common electrode part 154 of the second common electrode 122 formed in the second pixel area SP2.

Therefore, by adjusting a width of the first common electrode part 151 of the first common electrode 121 by adjusting a width of the slit 153 and a width of the third common electrode part 154 of the second common electrode 122 by adjusting a width of the slit 156, a first overlap area in which the first pixel electrode 131 overlaps the first common electrode 121 in the first pixel area SP1 may be adjusted, and a second overlap area in which the second pixel electrode 132 overlaps the second common electrode 122 in the second pixel area SP2 may be adjusted. Here, the first overlap area may be the same as the second overlap area. Therefore, flicker caused by a deviation of a change amount "ΔVp" of a pixel voltage can be prevented.

Figure 5A:
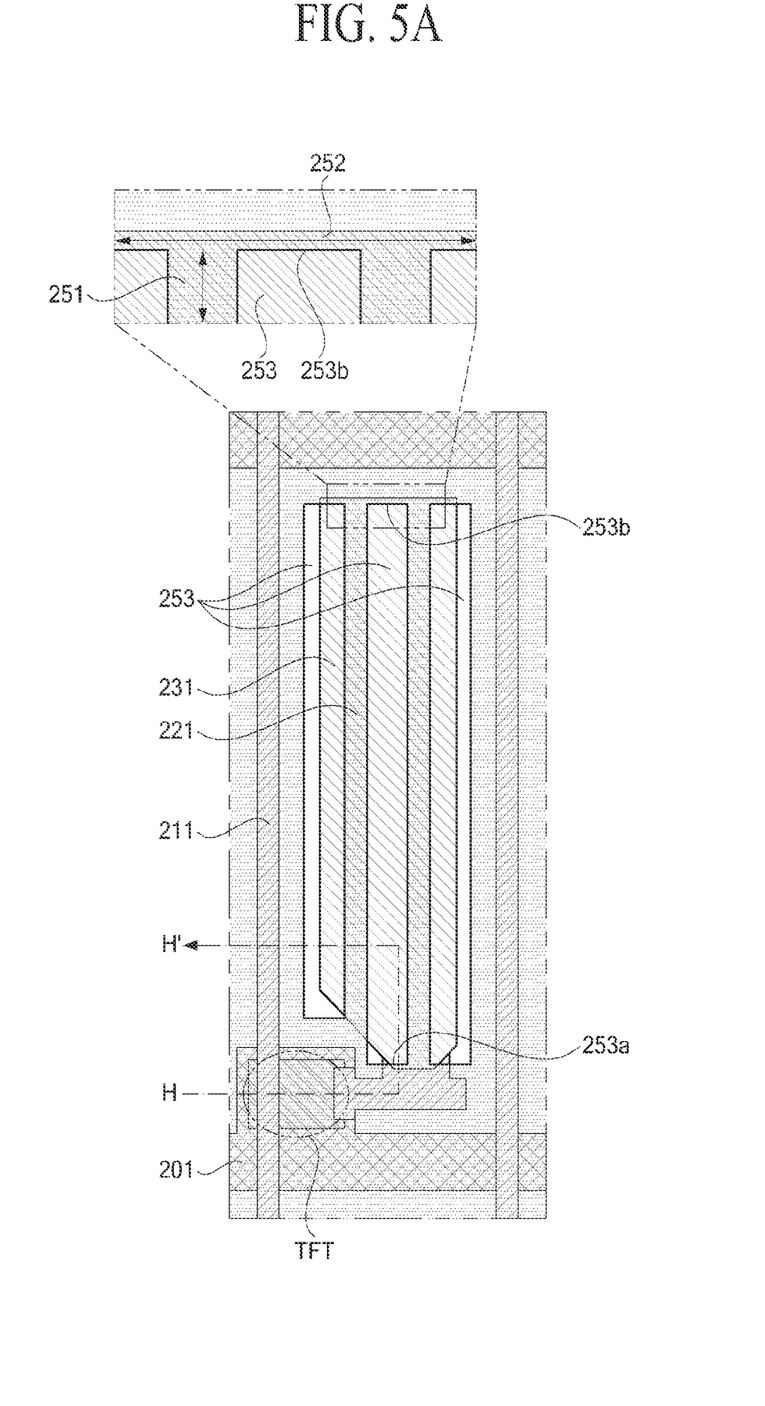
FIG. 5A is a front view of a first pixel area according to the second embodiment.
Figure 5B:
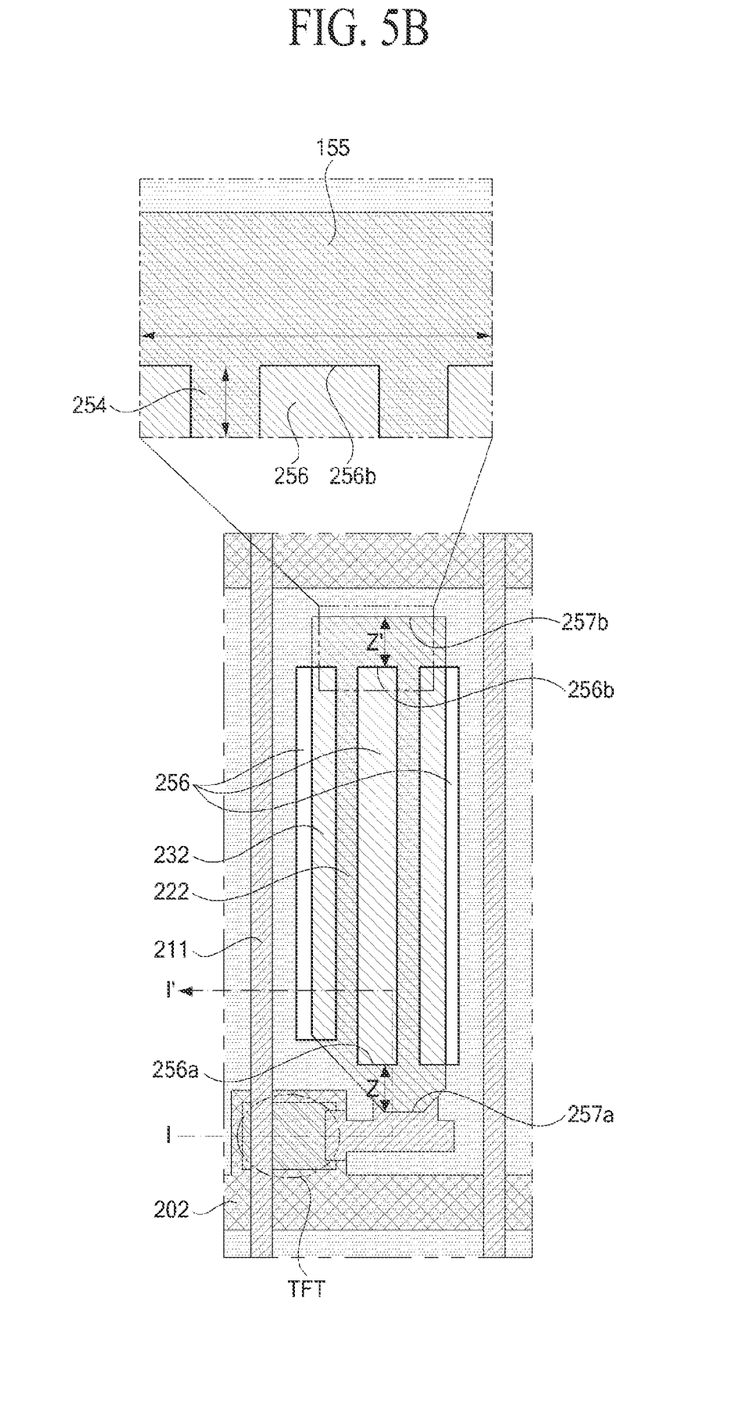
FIG. 5B is a front view of a second pixel area according to the second embodiment.

FIG. 5A is a front view of a first pixel area of a fringe filed LCD device according to a second embodiment, and FIG. 5B is a front view of a second pixel area of the fringe filed LCD device according to the second embodiment.

The first and second embodiments have the same technical scope and spirit, and may be combined. Repetitive descriptions on the above-described elements are not provided.

The second embodiment is described with reference to FIGS. 5A, 5B, 6A and 6B.

As illustrated in FIGS. 5A, 5B, 6A and 6B, the second pixel electrode 232 has a horizontal width and a vertical length. The second common electrode 222 has a horizontal width and a vertical length. Similarly, the slit 253 has a horizontal width and a vertical length. The vertical length of the slit 253 is defined by a first horizontal edge 253a and a second horizontal edge 253b of the slit 253. A length of a second common electrode part of a first common electrode 221 formed in a first pixel area SP1 is narrower than that of a fourth common electrode part of a second common electrode 222 formed in a second pixel area SP2.

Figure 6A:
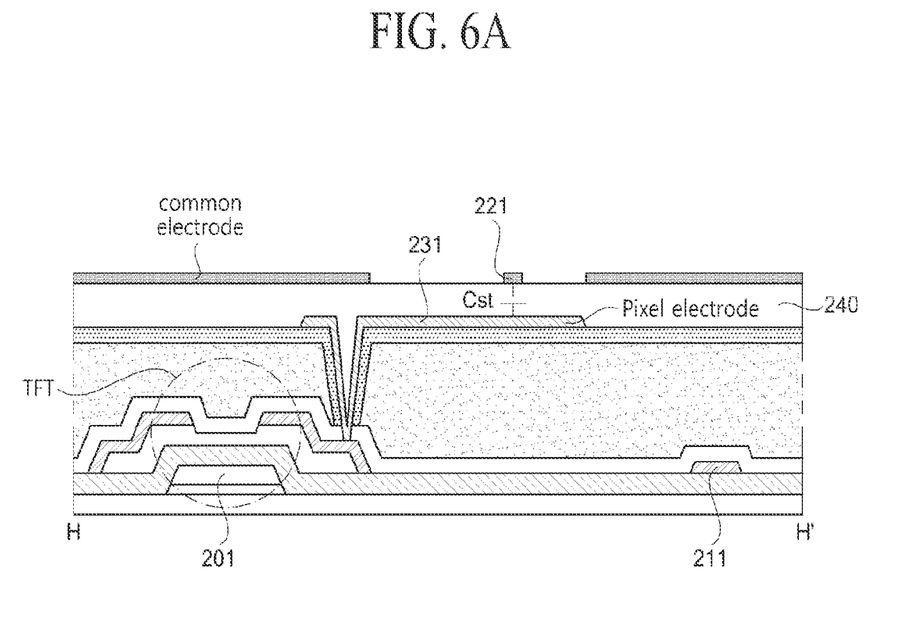
FIG. 6A is a cross-sectional view taken along line H-H' of FIG. 5A according to one embodiment.
Figure 6B:
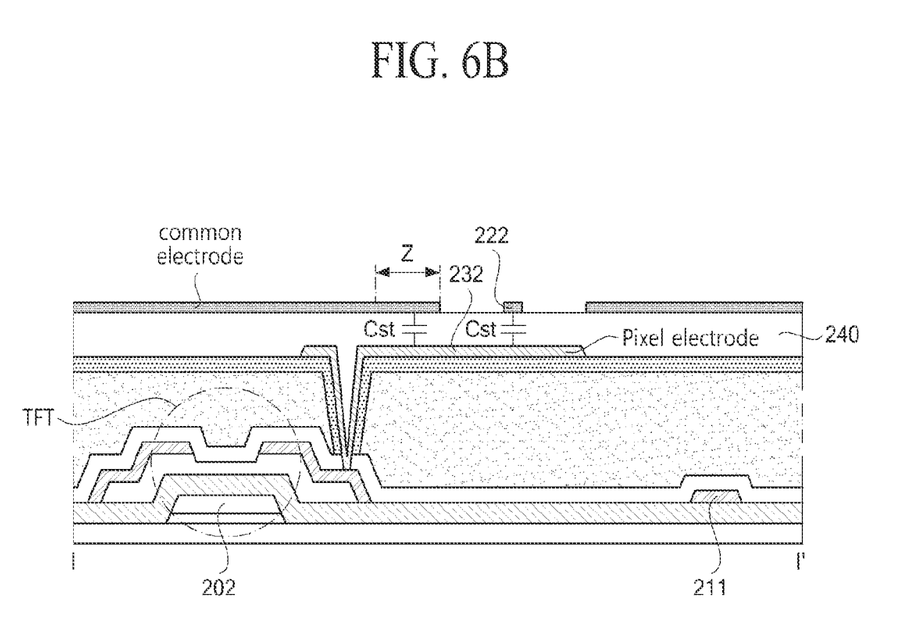
FIG. 6B is a cross-sectional view taken along line I-I' of FIG. 5B according to one embodiment.

That is, as illustrated in FIGS. 5B and 6B, a length of a fourth common electrode part of the second common electrode 222 formed in the second pixel area SP2 is adjusted so that the second common electrode 222 overlaps a second pixel electrode 232 by a distance Z and a distance Z' in the second pixel area SP2. The distance Z is defined as the length from the first horizontal edge 256a of the slit 256 to the bottom horizontal edge 257a of the second pixel electrode 232. The distance Z' is defined as the length from the second horizontal edge 256b of the slit 256 to the top horizontal edge 257b of the second pixel electrode 232. The width of the first common electrode part in the first pixel area SP1 and the width of the third common electrode part in the second pixel area SP2 are substantially the same.

Therefore, a third overlap area in which a first pixel electrode 231 overlaps the first common electrode 221 in the first pixel area SP1 may be adjusted, and a fourth overlap area in which a second pixel electrode 232 overlaps the second common electrode 222 in the second pixel area SP2 may be adjusted by adjusting the length of the fourth common electrode part. Here, the third overlap area may be the same as the fourth overlap area. Therefore, flicker caused by a deviation of a change amount "ΔVp" of a pixel voltage can be prevented.

As described above, in the fringe filed LCD device according to the embodiments of the present invention, since sizes of pixel areas are asymmetrically designed, R, G, and B pure color luminance can increase, and color coordinates can be prevented from being changed.

Moreover, in the fringe field LCD device according to the embodiments herein, since an area in which a common electrode and a pixel electrode formed in a pixel area overlap each other is designed to have a constant size irrespective of a size of the pixel area, flicker can be prevented from occurring due to an imbalance of a change amount "ΔVp" of a pixel voltage which is caused because sizes of pixel areas are asymmetrically designed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A fringe field liquid crystal display (LCD) device comprising:
   first display lines extending in a first direction;
   second display lines extending in a second direction intersecting the first direction;
   a plurality of first pixel areas that display a first plurality of colors including red light and green light and a plurality of second pixel areas that display a second plurality of colors that are distinct from the first plurality of colors, the second plurality of colors including white light and blue light, and wherein the plurality of first pixel areas are larger in size than the plurality of second pixel areas;
   a first pixel electrode formed in a first pixel area from the plurality of first pixel areas;
   a second pixel electrode formed in a second pixel area from the plurality of second pixel areas, the second pixel electrode configured to have a size which differs from a size of the first pixel electrode;
   a first common electrode configured to overlap the first pixel electrode with a protective layer formed between the first common electrode and the first pixel electrode, the first common electrode including at least one first slit part; and
   a second common electrode configured to overlap the second pixel electrode with the protective layer formed between the second common electrode and the second pixel electrode, the second common electrode including at least one second slit part which has a size that is different from a size of the at least one first slit part;
   wherein a pixel area displaying red light and a pixel area displaying green light included in a first pixel structure are disposed at a first side of a corresponding one of the first display lines, and wherein a pixel area displaying white light and a pixel area displaying blue light included in the first pixel structure are disposed at a second side of the corresponding one of the first display lines opposite the first side of the corresponding one of the first display lines, and
   wherein the pixel area displaying the red light in the first pixel structure and the pixel area displaying the blue light in the first pixel structure are located at a first side of a corresponding one of the second display lines, and wherein the pixel area displaying the green light in the first pixel structure and the pixel area displaying the white light in the first pixel structure are located at a second side of the corresponding one of the second display lines opposite the first side of the corresponding one of the second display lines,
   wherein the corresponding one of the first display lines sequentially includes a first portion extending in the first direction between the upper plurality of the first pixel areas and the lower plurality of the second pixel areas of the first pixel structure, a second portion extending in the second direction between the first pixel structure and an adjacent second pixel structure, and a third portion extending in the first direction between the lower plurality of the first pixel areas and the upper plurality of the second pixel areas of the adjacent second pixel structure in a plan view, and
   wherein an RGBW pixel structure is disposed in each of a plurality of areas which are defined by the first display lines and the second display lines.

2. The fringe field LCD device of claim 1, wherein the first common electrode is formed in the first pixel area which displays red light or green light, and
   the second common electrode is formed in the second pixel area which displays blue light or white light.

3. The fringe field LCD device of claim 1, wherein,
   the first common electrode comprises a first common electrode part and a second common electrode part in the first pixel area, the second common electrode part extending from the first common electrode part in a horizontal direction, and
   the first slit part is provided by the first common electrode part and the second common electrode part.

4. The fringe field LCD device of claim 3, wherein,
   the second common electrode comprises a third common electrode part and a fourth common electrode part in the second pixel area, the fourth common electrode part extending from the third common electrode part in the horizontal direction, and
   the second slit part is provided by the third common electrode part and the fourth common electrode part.

5. The fringe field LCD device of claim 4, wherein,
   the first common electrode part and the third common electrode part are formed in a direction of a data line of the fringe field LCD device, and
   the second common electrode part and the fourth common electrode part are formed in a direction of a gate line of the fringe field LCD device and perpendicular to the data line.

6. The fringe field LCD device of claim 4, wherein a width of the first common electrode part is different from a width of the third common electrode part.

7. The fringe field LCD device of claim 6, wherein the width of the first common electrode part is narrower than the width of each of the third common electrode part.

8. The fringe field LCD device of claim 4, wherein a length of the second common electrode part is different from a length of the fourth common electrode part.

9. The fringe field LCD device of claim 8, wherein the length of the second common electrode part is smaller than the length of the fourth common electrode part.

10. The fringe field LCD device of claim 1, wherein,
a storage capacitor having a first capacitance is formed between the first pixel electrode and the first common electrode,
a storage capacitor having a second capacitance is formed between the second pixel electrode and the second common electrode, and
the first capacitance is the same as the second capacitance.

11. A liquid crystal display (LCD) device comprising:
first display lines extending in a first direction;
second display lines extending in a second direction intersecting the first direction;
a plurality of first pixel areas that display a first plurality of colors including red light and green light;
a plurality of second pixel areas that display a second plurality of colors that are distinct from the first plurality of colors, the second plurality of colors including white light and blue light, wherein the plurality of second pixel areas are smaller than the plurality of first pixel areas;
a first pixel electrode formed in a first pixel area of a first pixel structure, the first pixel area from the plurality of first pixel areas and the first pixel electrode having a first size;
a first common electrode formed in the first pixel area, the first common electrode overlapping the first pixel electrode by a first overlap area;
a second pixel electrode formed in a second pixel area of the first pixel structure, the second pixel area from the plurality of second pixel areas and the second pixel electrode having a second size that is smaller than the first size of the first pixel electrode;
a second common electrode formed in the second pixel area, the second common electrode overlapping the second pixel electrode by a second overlap area;
wherein the first overlap area and the second overlap area are substantially the same;
wherein a pixel area displaying red light and a pixel area displaying green light included in the first pixel area of the first pixel structure are disposed at a first side of a corresponding one of the first display lines, and wherein a pixel area displaying white light and a pixel area displaying blue light included in the second pixel area of the first pixel structure are disposed at a second side of the corresponding one of the first display lines opposite the first side of the corresponding one of the first display lines, and
wherein the pixel area displaying the red light in the first pixel area of the first pixel structure and the pixel area displaying the blue light in the second pixel area of the first pixel structure are located at a first side of a corresponding one of the second display lines, and wherein the pixel area displaying the green light in the first pixel area of the first pixel structure and the pixel area displaying the white light in the second pixel area of the first pixel structure are located at a second side of the corresponding one of the second display lines opposite the first side of the corresponding one of the second display lines,
wherein the corresponding one of the first display lines sequentially includes a first portion extending in the first direction between the upper plurality of the first pixel areas and the lower plurality of the second pixel areas of the first pixel structure, a second portion extending in the second direction between the first pixel structure and an adjacent second pixel structure, and a third portion extending in the first direction between the lower plurality of the first pixel areas and the upper plurality of the second pixel areas of the adjacent second pixel structure in a plan view, and
wherein an RGBW pixel structure is disposed in each of a plurality of areas which are defined by the first display lines and the second display lines.

12. The LCD device of claim 11, wherein a first storage capacitor having a first capacitance is formed in the first overlap area in the first pixel area and a second storage capacitor having a second capacitance is formed in the second overlap area in the second pixel area, the first capacitance and the second capacitance being substantially the same.

13. The LCD device of claim 12, wherein the first common electrode includes a first slit in which a portion of the first common electrode is opened in the first pixel area and the second common electrode includes a second slit in which a portion of the second common electrode is opened in the second pixel area.

14. The LCD device of claim 13, wherein the first common electrode includes a first common electrode part that is formed in a direction of a data line of the LCD device that extends into the first pixel area and a second common electrode part that is formed in a direction of a gate line of the LCD device and perpendicular to the data line, and wherein the second common electrode includes a third common electrode part that is formed in the direction of the data line of the LCD device that extends into the second pixel area and a fourth second common electrode part that is formed in the direction of the gate line of the LCD device and perpendicular to the data line.

15. The LCD device of claim 14, wherein the first storage capacitor formed in the first overlap area is formed between the first common electrode part of the first common electrode and the first pixel electrode, and the second storage capacitor formed in the second overlap area is formed between the third common electrode part of the second common electrode and the second pixel electrode.

16. The LCD device of claim 15, wherein a width of the first common electrode part is less than a width of third common electrode part and a length of the second common electrode part is substantially the same as a length of the fourth common electrode part.

17. The LCD device of claim 15, wherein a length of the second common electrode part of the first common electrode is less than a length of the fourth common electrode part of the second common electrode.

18. The LCD device of claim 14, wherein the first storage capacitor formed in the first overlap area is formed between the first common electrode part of the first common electrode and the first pixel electrode, and the second storage capacitor formed in the second overlap area is formed between the third common electrode part of the second common electrode and the second pixel electrode and between the fourth common electrode part and the second pixel electrode.

19. The LCD device of claim 14, wherein the first slit is formed at an intersection of the first common electrode part and the second common electrode part of the first common electrode and the second slit is formed at an intersection of the third common electrode part and the fourth common electrode part of the second common electrode.

\* \* \* \* \*